United States Patent
Jonas

(10) Patent No.: US 7,900,052 B2
(45) Date of Patent: Mar. 1, 2011

(54) CONFIDENTIAL DATA SHARING AND ANONYMOUS ENTITY RESOLUTION

(75) Inventor: Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 10/702,624

(22) Filed: Nov. 6, 2003

(65) Prior Publication Data

US 2004/0210763 A1    Oct. 21, 2004

Related U.S. Application Data

(60) Provisional application No. 60/424,240, filed on Nov. 6, 2002.

(51) Int. Cl.
*G06F 21/00* (2006.01)
(52) U.S. Cl. ............... 713/179; 713/153; 713/155; 713/166; 713/168; 713/185; 713/193; 726/3; 726/4; 726/5; 726/14; 726/15; 726/17; 726/28; 726/29; 726/30
(58) Field of Classification Search ............. 713/189, 713/193, 166, 168, 181, 182, 179, 185, 153, 713/155; 726/3–5, 14, 15, 17, 28–30; 707/3; 380/227, 228
See application file for complete search history.

(56) References Cited

U.S. PATENT DOCUMENTS

| | | |
|---|---|---|
| 1,261,167 A | 4/1918 | Russell |
| 3,659,085 A | 4/1972 | Porter |
| 3,793,634 A | 2/1974 | Heller et al. |
| 4,138,057 A * | 2/1979 | Atalla ............... 235/380 |
| 4,232,313 A | 11/1980 | Fleishman |

(Continued)

FOREIGN PATENT DOCUMENTS

CN    1641716    7/2005

(Continued)

OTHER PUBLICATIONS

International Search Report from PCT/US03/35607, dated Apr. 24, 2004.

(Continued)

*Primary Examiner*—Carl Colin
(74) *Attorney, Agent, or Firm*—Gates & Cooper LLP

(57) ABSTRACT

A method, program and system for processing data is disclosed. The data comprises identifiers of a plurality of entities. The method, program and system comprising the steps of: (a) receiving one or more records, each record having a plurality of identifiers, each record corresponding with at least one entity, (b) utilizing a cryptographic algorithm to process at least two of the plurality of identifiers in the record, (c) sometimes after transmitting the processed record to a separate system or database, comparing the processed record to previously stored data; (d) matching the processed record with previously stored data that is determined to reflect the entity, the previously stored data that is determined to reflect the entity comprising at least a portion of at least two previously received records and/or based upon another identifier; and/or (e) associating the processed record with previously stored data that is determined to reflect a relationship with the entity.

145 Claims, 7 Drawing Sheets

U.S. PATENT DOCUMENTS

| | | |
|---|---|---|
| 4,981,370 A | 1/1991 | Dziewit et al. |
| 5,003,598 A * | 3/1991 | Kunstadt .................... 380/270 |
| 5,010,478 A | 4/1991 | Deran |
| 5,229,764 A | 7/1993 | Matchett et al. |
| 5,384,849 A | 1/1995 | Jeong |
| 5,403,639 A | 4/1995 | Belsan et al. |
| 5,454,101 A | 9/1995 | Mackay et al. |
| 5,534,855 A | 7/1996 | Shockley et al. |
| 5,555,409 A | 9/1996 | Leenstra et al. |
| 5,560,006 A | 9/1996 | Layden et al. |
| 5,600,835 A | 2/1997 | Garland et al. |
| 5,608,907 A | 3/1997 | Fehskens et al. |
| 5,659,731 A | 8/1997 | Gustafson |
| 5,675,785 A | 10/1997 | Hall et al. |
| 5,742,807 A * | 4/1998 | Masinter ........................ 707/1 |
| 5,758,343 A | 5/1998 | Vigil et al. |
| 5,764,977 A | 6/1998 | Oulid-Aissa et al. |
| 5,778,375 A | 7/1998 | Hecht |
| 5,781,911 A | 7/1998 | Young et al. |
| 5,784,464 A | 7/1998 | Akiyama et al. |
| 5,794,246 A | 8/1998 | Sankaran et al. |
| 5,799,309 A | 8/1998 | Srinivasan |
| 5,819,263 A | 10/1998 | Bromley et al. |
| 5,848,373 A | 12/1998 | Delorme et al. |
| 5,878,416 A | 3/1999 | Harris et al. |
| 5,892,828 A | 4/1999 | Perlman |
| 5,897,637 A * | 4/1999 | Guha ........................ 707/101 |
| 5,933,831 A | 8/1999 | Jorgensen |
| 5,991,408 A | 11/1999 | Pearson et al. |
| 5,991,733 A | 11/1999 | Aleia et al. |
| 5,991,758 A | 11/1999 | Ellard |
| 5,991,765 A | 11/1999 | Vethe |
| 5,995,097 A | 11/1999 | Tokumine et al. |
| 5,995,973 A | 11/1999 | Daudenarde |
| 6,014,670 A | 1/2000 | Zamanian et al. |
| 6,032,158 A | 2/2000 | Mukhopadhyay et al. |
| 6,035,295 A | 3/2000 | Klein |
| 6,035,300 A | 3/2000 | Cason et al. |
| 6,035,306 A | 3/2000 | Lowenthal et al. |
| 6,041,410 A | 3/2000 | Hsu et al. |
| 6,044,378 A | 3/2000 | Gladney |
| 6,049,805 A | 4/2000 | Drucker et al. |
| 6,052,693 A | 4/2000 | Smith et al. |
| 6,058,477 A | 5/2000 | Kusakabe et al. |
| 6,065,001 A | 5/2000 | Ohkubo et al. |
| 6,073,140 A | 6/2000 | Morgan et al. |
| 6,076,167 A | 6/2000 | Borza |
| 6,092,199 A | 7/2000 | Dutcher et al. |
| 6,122,641 A | 9/2000 | Williamson et al. |
| 6,122,757 A | 9/2000 | Kelley |
| 6,160,903 A | 12/2000 | Hamid et al. |
| 6,167,517 A | 12/2000 | Gilchrist et al. |
| 6,185,557 B1 | 2/2001 | Liu |
| 6,189,016 B1 | 2/2001 | Cabrera et al. |
| 6,202,151 B1 | 3/2001 | Musgrave et al. |
| 6,208,990 B1 | 3/2001 | Suresh et al. |
| 6,240,409 B1 | 5/2001 | Aiken |
| 6,249,784 B1 | 6/2001 | Macke et al. |
| 6,263,446 B1 | 7/2001 | Kausik et al. |
| 6,272,495 B1 | 8/2001 | Hetherington |
| 6,289,334 B1 | 9/2001 | Reiner et al. |
| 6,292,900 B1 * | 9/2001 | Ngo et al. ........................ 726/6 |
| 6,310,966 B1 | 10/2001 | Dulude et al. |
| 6,317,834 B1 | 11/2001 | Gennaro et al. |
| 6,334,132 B1 | 12/2001 | Weeks |
| 6,339,775 B1 | 1/2002 | Zamanian et al. |
| 6,357,004 B1 | 3/2002 | Davis |
| 6,385,604 B1 | 5/2002 | Bakalash et al. |
| 6,397,224 B1 | 5/2002 | Zubeldia et al. |
| 6,418,450 B2 | 7/2002 | Daudenarde |
| 6,446,210 B1 | 9/2002 | Borza |
| 6,460,037 B1 | 10/2002 | Weiss et al. |
| 6,523,041 B1 | 2/2003 | Morgan et al. |
| 6,674,860 B1 | 1/2004 | Pirila |
| 6,684,334 B1 | 1/2004 | Abraham |
| 6,690,820 B2 | 2/2004 | Lees et al. |
| 6,697,947 B1 | 2/2004 | Matyas, Jr. et al. |
| 6,725,243 B2 * | 4/2004 | Snapp ........................ 707/203 |
| 6,734,783 B1 | 5/2004 | Anbai |
| 6,743,022 B1 | 6/2004 | Sarel |
| 6,757,689 B2 | 6/2004 | Battas et al. |
| 6,788,779 B2 | 9/2004 | Ostapchuck |
| 6,801,915 B1 | 10/2004 | Mack |
| 6,810,405 B1 | 10/2004 | LaRue et al. |
| 6,819,797 B1 | 11/2004 | Smith |
| 6,845,159 B1 * | 1/2005 | Domstedt et al. ............. 380/44 |
| 6,865,561 B1 * | 3/2005 | Allport et al. ................ 705/406 |
| 6,886,747 B2 | 5/2005 | Snapp |
| 6,912,549 B2 | 6/2005 | Rotter et al. |
| 6,931,392 B1 | 8/2005 | Skeen |
| 6,948,062 B1 | 9/2005 | Clapper |
| 6,954,757 B2 | 10/2005 | Zargham et al. |
| 6,968,338 B1 | 11/2005 | Gawdiak et al. |
| 7,003,560 B1 | 2/2006 | Mullen et al. |
| 7,007,168 B2 | 2/2006 | Kubo et al. |
| 7,024,562 B1 | 4/2006 | Flink et al. |
| 7,046,802 B2 | 5/2006 | Rogaway |
| 7,047,418 B1 | 5/2006 | Ferren et al. |
| 7,092,951 B1 | 8/2006 | Luo et al. |
| 7,103,778 B2 * | 9/2006 | Kon et al. .................... 713/185 |
| 7,124,305 B2 * | 10/2006 | Margolus et al. ............ 713/193 |
| 7,143,289 B2 | 11/2006 | Denning et al. |
| 7,149,782 B2 * | 12/2006 | Sommerer .................. 709/206 |
| 7,177,426 B1 | 2/2007 | Dube |
| 7,188,362 B2 | 3/2007 | Brandys |
| 7,194,484 B2 * | 3/2007 | Aoki ........................ 707/104.1 |
| 7,200,549 B1 | 4/2007 | Fujii et al. |
| 7,228,335 B2 * | 6/2007 | Caughey .................... 709/206 |
| 7,228,437 B2 * | 6/2007 | Spagna et al. ................ 713/193 |
| 7,240,027 B2 | 7/2007 | McConnell et al. |
| 7,249,257 B2 | 7/2007 | Brundage et al. |
| 7,254,839 B2 | 8/2007 | Fahraeus et al. |
| 7,412,462 B2 * | 8/2008 | Margolus et al. ............ 707/200 |
| 7,512,234 B2 | 3/2009 | McDonnell et al. |
| 7,599,930 B1 | 10/2009 | Burns et al. |
| 2001/0049690 A1 | 12/2001 | McConnell et al. |
| 2002/0023088 A1 | 2/2002 | Thwaites |
| 2002/0037082 A1 | 3/2002 | Aoki et al. |
| 2002/0038308 A1 | 3/2002 | Cappi |
| 2002/0043566 A1 * | 4/2002 | Goodman et al. ........... 235/492 |
| 2002/0073099 A1 | 6/2002 | Gilbert et al. |
| 2002/0077898 A1 * | 6/2002 | Koulouris .................... 705/14 |
| 2002/0091678 A1 | 7/2002 | Miller et al. |
| 2002/0107864 A1 | 8/2002 | Battas et al. |
| 2002/0107957 A1 | 8/2002 | Zargham et al. |
| 2002/0112177 A1 | 8/2002 | Voltmer et al. |
| 2002/0124176 A1 | 9/2002 | Epstein |
| 2002/0165903 A1 | 11/2002 | Zargham et al. |
| 2002/0184509 A1 | 12/2002 | Scheidt et al. |
| 2003/0030733 A1 | 2/2003 | Seaman et al. |
| 2003/0091218 A1 | 5/2003 | Hamid |
| 2003/0097380 A1 | 5/2003 | Mulhern et al. |
| 2003/0108202 A1 | 6/2003 | Clapper |
| 2003/0115475 A1 * | 6/2003 | Russo et al. ................ 713/186 |
| 2003/0154194 A1 | 8/2003 | Jonas |
| 2003/0182018 A1 * | 9/2003 | Snapp ........................ 700/225 |
| 2003/0182568 A1 * | 9/2003 | Snapp et al. ................ 713/193 |
| 2003/0191739 A1 | 10/2003 | Chatterjee et al. |
| 2003/0200447 A1 * | 10/2003 | Sjoblom .................... 713/186 |
| 2004/0002816 A1 | 1/2004 | Milosavljevic |
| 2004/0007616 A1 | 1/2004 | Snapp |
| 2004/0015706 A1 * | 1/2004 | Eshghi et al. ................ 713/189 |
| 2004/0019518 A1 | 1/2004 | Abraham et al. |
| 2004/0049682 A1 | 3/2004 | Wilson et al. |

| | | | |
|---|---|---|---|
| 2004/0128274 | A1 | 7/2004 | Snapp et al. |
| 2004/0143724 | A1 | 7/2004 | Jacob et al. |
| 2004/0162802 | A1 | 8/2004 | Jonas |
| 2004/0162984 | A1* | 8/2004 | Freeman et al. ............ 713/175 |
| 2004/0193893 | A1* | 9/2004 | Braithwaite et al. ........ 713/186 |
| 2004/0210763 | A1 | 10/2004 | Jonas |
| 2004/0236720 | A1 | 11/2004 | Basso et al. |
| 2005/0060556 | A1 | 3/2005 | Jonas |
| 2005/0066182 | A1 | 3/2005 | Jonas |
| 2005/0097318 | A1 | 5/2005 | Bolosky et al. |
| 2005/0165852 | A1 | 7/2005 | Albornoz et al. |
| 2005/0182777 | A1 | 8/2005 | Block et al. |
| 2006/0010119 | A1 | 1/2006 | Jonas |
| 2007/0198275 | A1* | 8/2007 | Malden et al. ................. 705/1 |

FOREIGN PATENT DOCUMENTS

| | | |
|---|---|---|
| CN | 1757188 | 4/2006 |
| CN | 1839384 | 9/2006 |
| DE | 19715664 | 10/1988 |
| EP | 1130513 | 9/2001 |
| JP | 63282838 | 11/1988 |
| JP | 2012563 | 1/1990 |
| JP | 03-017792 | 1/1991 |
| JP | 04-237373 | 8/1992 |
| JP | 4185188 | 10/1992 |
| JP | 05-127959 | 5/1993 |
| JP | 05-250416 | 9/1993 |
| JP | 10154231 | 6/1998 |
| JP | 10275158 | 10/1998 |
| JP | 10327142 | 12/1998 |
| JP | 11184884 | 7/1999 |
| JP | 11224236 | 8/1999 |
| JP | 11265432 | 9/1999 |
| JP | 11296532 | 10/1999 |
| JP | 2000339351 | 12/2000 |
| JP | 2001117940 | 4/2001 |
| JP | 2001325425 | 11/2001 |
| JP | 2001525960 | 12/2001 |
| JP | 2002222170 | 8/2002 |
| JP | 2002334114 | 11/2002 |
| JP | 2008305662 | 12/2008 |
| JP | 2009204401 | 9/2009 |
| WO | 99/14692 | 3/1999 |
| WO | 99/40702 | 8/1999 |
| WO | 99/64970 | 12/1999 |
| WO | 01/22285 | 3/2001 |
| WO | 01/29780 | 4/2001 |
| WO | 98/52317 | 5/2010 |

OTHER PUBLICATIONS

Written Opinion for International Application No. PCT/US02/41630 dated Jan. 19, 2005.
Written Opinion for International Application No. PCT/US04/09035 dated Nov. 4, 2004.
International Search Report from PCT/US03/35607 dated Apr. 24, 2004.
International Search Report for PCT/US04/03465 dated Apr. 7, 2005.
International Search Report for PCT/US03/41662 dated May 28, 2004.
International Search Report for PCT/US04/09035 dated Nov. 4, 2004.
Hanming Tu, Pattern Recognition and Geographical Data Standardization, The Proceedings of Geoinformatics '99 Conference, Jun. 19-21, 1999, pp. 1-7.
Matchware Technologies Inc., AUTOSTAN, Generalized Standardization System, User's Manual Version 4.6, Feb. 11, 1998, pp. 1-90.
Vality Technology Incorporated, INTEGRITY, Data Re-enginering Environment, SUPERSTAN User Guide Version 2.5, Mar. 1998.
Jaro, "Record Linkage Research and the Calibration of Record Linkage Algorithms", U.S. Bureau of the Census, Report No. rr-84/27 (Aug. 9, 1984).
DeWitt et al., *An Evaluation of Non-Equijoin Algorithms*, Proc. 17$^{th}$ Intl. Conf. on Very Large Data Bases, Sep. 1991, pp. 443-452.
Verykios et al., *A Bayesian decision model for cost optimal record matching*, The VLDB Journal, 2000, vol. 12, Nos. 28-450, pp. 28-40.
Yuwono et al., *Search and Ranking Algorithms for Locating Resources on the World Wide Web*, Intl. Conf. on Data Engineering, 1996, pp. 164-171.
Hou et al., *Medical Image Retrieval by Spatial Features*, 1992 IEEE Intl. Conf. on Systems, Man and Cybernetics, Oct. 1992, vol. 1, pp. 1364-1369.
Callan et al., *Searching Distributed Collections With Inference Networks*, Proc. 18$^{th}$ Annual Intl. ACM SIGIR Conf. on R&D in Information Retrieval, Jul. 9-13, 1995, pp. 21-28.
DeFazio et al., *Integrating IR and RDBMS Using Cooperative Indexing*, Proc. 18$^{th}$ Annual Intl. ACM SIGIR Conf. on R&D in Information Retrieval, Jul. 9-13, 1995, pp. 84-92.
Sclaroff et al., *ImageRover: A Content-Based Image Browser for the World Wide Web*, IEEE Workshop on Content-Based Access of Image and Video Libraries, Jun. 1997, pp. 2-9.
Knoblock, *Searching the World Wide Web*, Trends & Controversies, Jan.-Feb. 1997, pp. 8-24.
Amba et al., *Automatic Linking of Thesauri*, Proc. 18$^{th}$ Annual Intl. ACM SIGIR Conf. on R&D in Information Retrieval, Jul. 9-13, 1995, pp. 181-188.
Gelbart et al., *Toward a Comprehensive Legal Information Retrieval System*, Database and Expert Systems Applns., Proc. Intl. Conf. in Vienna, Austria, 1990, pp. 121-125.
Kimoto et al., *Construction of a Dynamic Thesaurus and Its Use for Associated Information Retrieval*, Proc. 13$^{th}$ Intl. Conf. on R&D in Information Retrieval, Sep. 5-7, 1990, pp. 227-241.
Findler, *Information Retrieval Systems*, An Artificial Intelligence Technique for Information and Fact Retrieval, 1991.
Yearwood et al., *Retrieving cases for treatment advice in nursing using text representation and structured text retrieval*, Artificial Intelligence in Medicine, Jan. 1997, vol. 9, No. 1, pp. 79-98.
Batory et al., *Implementation Concepts for an Extensible Data Model and Data Language*, acm Transactions on Database Systems, Sep. 1988, vol. 13, No. 3, pp. 231-262.
Labio et al., *The WHIPS Prototype for Data Warehouse Creation and Maintenance*, 1997, pp. 557-559.
Suardi et al., *Execution of Extended Multidatabase SQL*, 1993, pp. 641-650.
Romberg, *Meta-Entities Keeping Pace with Change*, Database Programming & Design, Jan. 1995, pp. 54-59.
Crane et al., "Project LINK-LINK: An Interactive Database of Administrative Record Linkage Studies", National Center for Education Statistics and U.S. Department of Agriculture, Record Linkage Techniques—1985: Proceedings of the Workshop on Exact Matching Methodologies, Arlington, VA, pp. 311-315 (May 9-10, 1985).
Childers et al., *The IRS/Census Direct Match Study—Final Report*, Bureau of the Census—Statistical Research Division Report Series, Aug. 1, 1984, pp. 1-22.
LaPlant Jr., *Generalized Data Standardization Program Generator (GENSTAN) Program Generation System Part II*, Bureau of the Census Statistical Research Division Report Series, Jul. 22, 1986.
LaPlant Jr., *User's Guide for the Generalized Record Linkage Program Generator (GENLINK) SRD Program Generator System User's Guide: Part III*, Bureau of the Census Statistical Research Division Report Series, Sep. 1, 1986.
Winkler et al., *An Application of the Fellegi-Sunter Model of Record Linkage to the 1990 U.S. Decennial Census*.
Hernandez, *A Generalization of Band Joins and the Merge/Purge Problem*, IEEE Trans. on Knowledge and Data Engineering, 1996.
Lu et al., *Pipelined Band Join in Shared-Nothing Systems*, Proc. 1995 Asian Computing Science Conf., Dec. 1995, pp. 239-253.
Beebe, "Why are Epidemiologists Interested in Matching Algorithms?", National Cancer Institute, Record Linkage Techniques—1985: Proceedings of the Workshop on Exact Matching Methodologies, Arlington, VA, pp. 139-143 (May 9-10, 1985).
Boruch et al., "Exact Matching of Micro Data Sets in Social Research: Benefits and Problems", Record Linkage Techniques—1985: Proceedings of the Workshop on Exact Matching Methodologies, Arlington, VA, pp. 145-153 (May 9-10, 1985).

Scheuren, "Methodologic Issues in Linkage of Multiple Data Bases", National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 155-178 (May 9-10, 1985).

Winkler, "Processing of Lists and String Comparison", Energy Information Administration, Record Linkage Techniques—1985: Proceedings of the Workshop on Exact Matching Methodologies, Arlington, VA, pp. 181-187 (May 9-10, 1985).

Jaro, "Current Record Linkage Research", U.S. Bureau of the Census, Record Linkage Techniques—1985: Proceedings of the Workshop on Exact Matching Methodologies, Arlington, VA, pp. 317-320 (May 9-10, 1985).

Smith, "Record-Keeping and Data Preparation Practices to Facilitate Record Linkage", Statistics Canada, Record Linkage Techniques—1985: Proceedings of the Workshop on Exact Matching Methodologies, Arlington, VA, pp. 321-326 (May 9-10, 1985).

Hill et al., "Generalized Iterative Record Linkage System", Statistics Canada, Record Linkage Techniques—1985: Proceedings of the Workshop on Exact Matching Methodologies, Arlington, VA, pp. 327-333 (May 9-10, 1985).

Howe et al., "A Generalized Iterative Record Linkage Computer System for Use in Medical Follow-up Studies", Computers and Biomedical Research 14, pp. 327, 240 (1981).

Lee, Joon Ho, "Combining Multiple Evidence from Different Properties of Weighting Schemes", Proceedings of the 18th Annual International ACM SIGIR Conference on Research and Development in Information Retrieval, Seattle, Washington, USA (Jul. 9-Jul. 13, 1995) pp. 180-188.

Chinese Office Action dated Jun. 19, 2009, Application No. 20071018090X with English translation of First Examination Report.

"Oracle Warehouse Builder: A Technical Overview," Oracle Technical White Paper, Jan. 1, 2000, pp. 1-21.

Dempsey et al., "Technologies That Can Protect Privacy as Information is Shared to Combat Terrorism," Legal Memorandum, No. 11, May 26, 2004, pp. 1-12.

Garcia et al., "Immunization Registries DeDuplication and Record Matching," White Paper, Internet citation, 1999, www.immunizationregistries.com/white_papers/WHP006A_deduplication_recordmatching.pdf, pp. 1-11.

Hoshino, "Inter-database relationships discovery and retrieval method for multidatabase environment," Jul. 10, 1998, vol. 98, No. 58, pp. 389-396 (with English Abstract).

Hundepool, "The CASC Project: Summary," Computation Aspects of Statistical Confidentiality, Feb. 2005, pp. 1-22.

Munakata, "Integration of heterogenous information sources," Institute of Systems Control and Information Engineers, Dec. 15, 1996, vol. 40, No. 12, pp. 14-21 (with English Abstract).

Rahm et al., "Data Cleaning: Problems and Current Approaches" Quarterly Bulletin of the Computer Science of the IEEE Technical Committee on Data Engineering, Dec. 1, 2000, pp. 1-11.

Ratha et al., "Enhancing security and privacy in biometric-based authentication systems," IBM Systems Journal, Aug. 2001, pp. 614-634.

Sattler et al., "A Data Preparation Framework Based on a Multidatabase Language," Database Engineering & Applications, 2001, International Symposium on Jul. 16-18, 2001, pp. 219-228.

Suzuki et al., "Fragment view-heterogeneity resolution method in multi-database without global view," The Institute of Electronics Information and Communication Engineers, Tech Report of IICE, 1997, pp. 25-30 (with English Abstract).

Takezaki et al., "A method of database linkage between telephone directory and residential map," NTT Electrical Communication Lab, National Convention Record 1987, Mar. 26-29, p. 1-111 (with English Abstract). (No. 1).

Takezaki et al., "A method of database linkage between telephone directory and residential map," NTT Electrical Communication Lab, National Convention Record 1987, Mar. 26-29, No. 1, p. 6-91 (with English Abstract). (No. 2).

Whalen et al., "Linking Client Records from Substance Abuse, Mental Health and Medicaid State Agencies," Internet citation, Jul. 2001, www.samhsa.gov/centers/csat/content/idbse/linking.pdf, pp. 9-13.

Supplementary European Search Report dated Sep. 2, 2010, Application No. EP 03 79 6368.

Haisten, M., "Designing a Data Warehouse," Apr. 18, 2004, http://www.dannanconsulting.com/solutions_org/whitepaper/designing.pdf.

Li, W., "Skew Handling Techniques in Sort-Merge Join," ACM SIGMOD, Jun. 4-6, 2002, Madison, Wisconsin, USA, 12 pages.

Monge, A., "Matching Algorithms within a Duplicate Detection System," IEEE Computer Society Technical Committee on Data Engineering, 2000, 7 pages.

Van Den Bercken, J., et al., "The bulk index join: a generic approach to processing non-equijoins," Data Engineering, 1999, Proceedings, 15th International Conference, 18 pages.

Wang, G., "Automatically detecting deceptive criminal identities," Communications of the ACM, vol. 47, Issue 3, Mar. 2004, 14 pages.

Winkler, W., "Advanced Methods For Record Linkage," http://www.census.gov/srd/papers/pdf/rr94-5.pdf, 1994, 24 pages.

Winkler, W., "Matching and Record Linkage," Bureau of the Census, Business Survey Methods, 1995, pp. 374-403.

Winkler, W., "The State of Record Linkage and Current Research Problems," Bureau of the Census, Statistical Research Division, U.S. Census Bureau, http://www.census.gov/srd/papers/pdf/rr99-04.pdf, 1999, 15 pages.

Winkler, W., "Record Linkage Software and Methods for Merging Administrative Lists," Bureau of the Census, Statistical Research Division, No. RR2001103, Jul. 23, 2001, 11 pages.

Fellegi, I., "Tutorial on the Fellegi-Sunter Model for Record Linkage," Section II, Overview of Applications and Introduction to Theory, 1985, pp. 127-138.

Haisten, M., "Information Discovery in the Data Warehouse," InfoDB, vol. 9, No. 6, 1997, pp. 14-25.

Scheuren, F., "Recursive Merging and Analysis of Administrative Lists and Data," 1996, 7 pages.

Japanese Office Action dated Mar. 30, 2010, Japanese Patent Application No. 2004-551903.

* cited by examiner

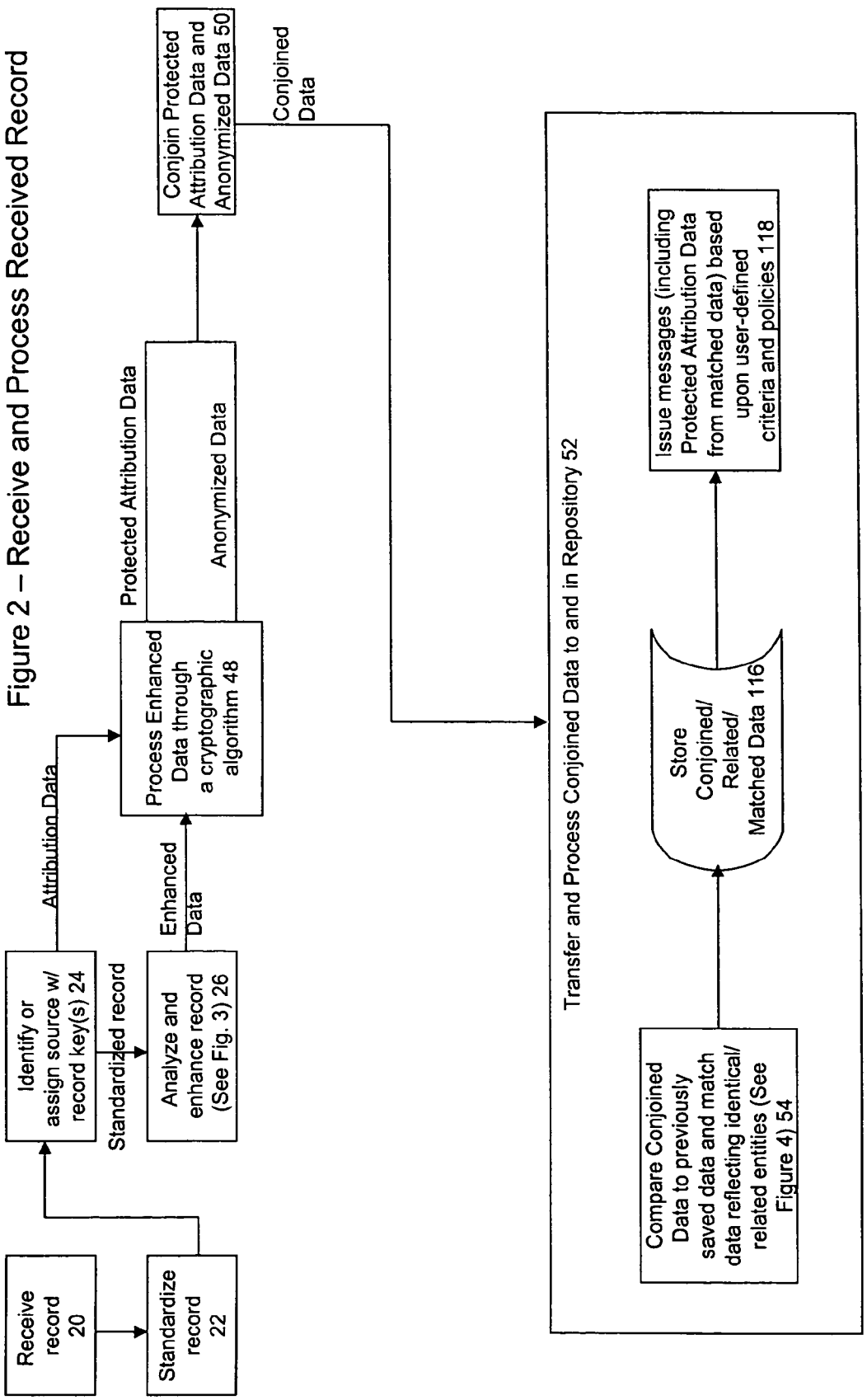

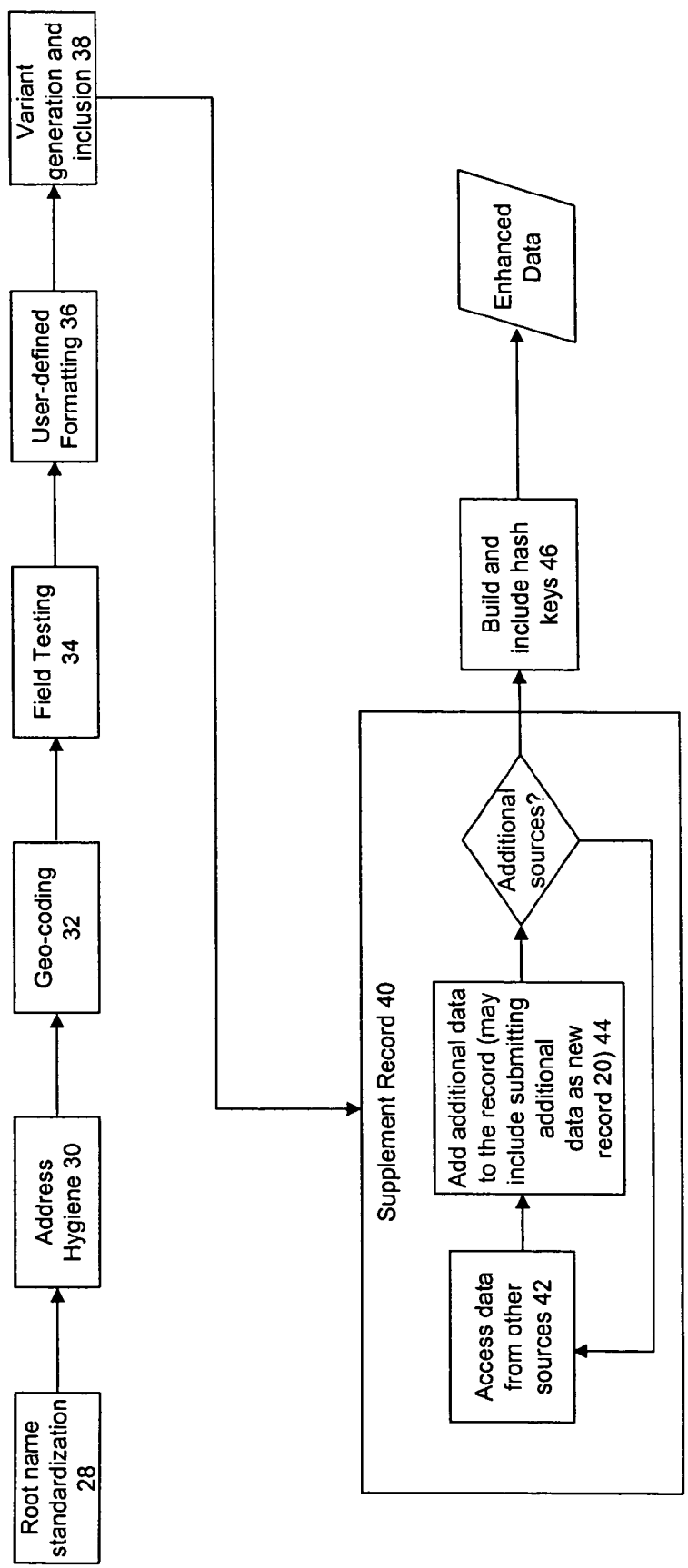
Figure 3 – Analyze and Enhance Record 26

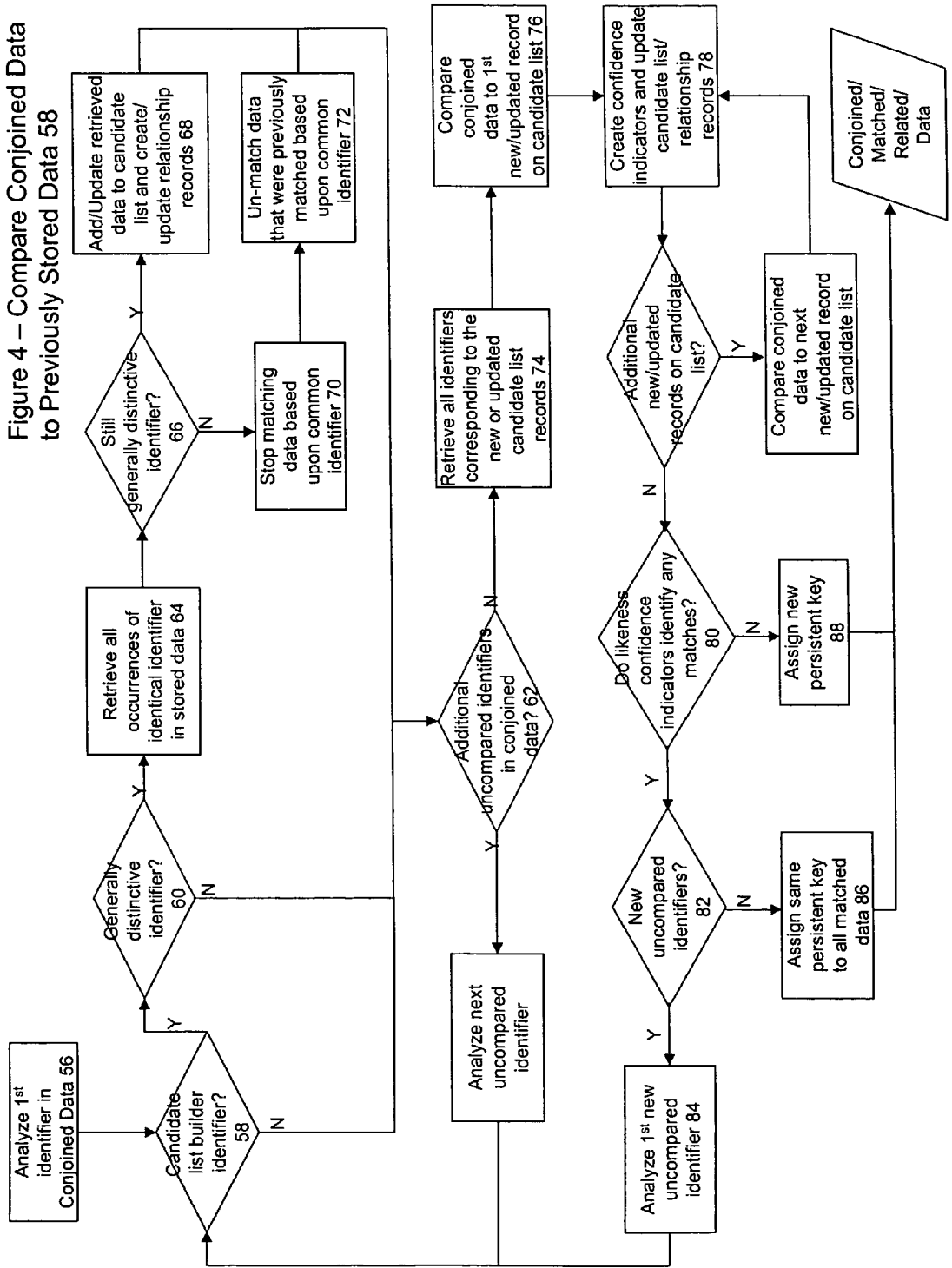

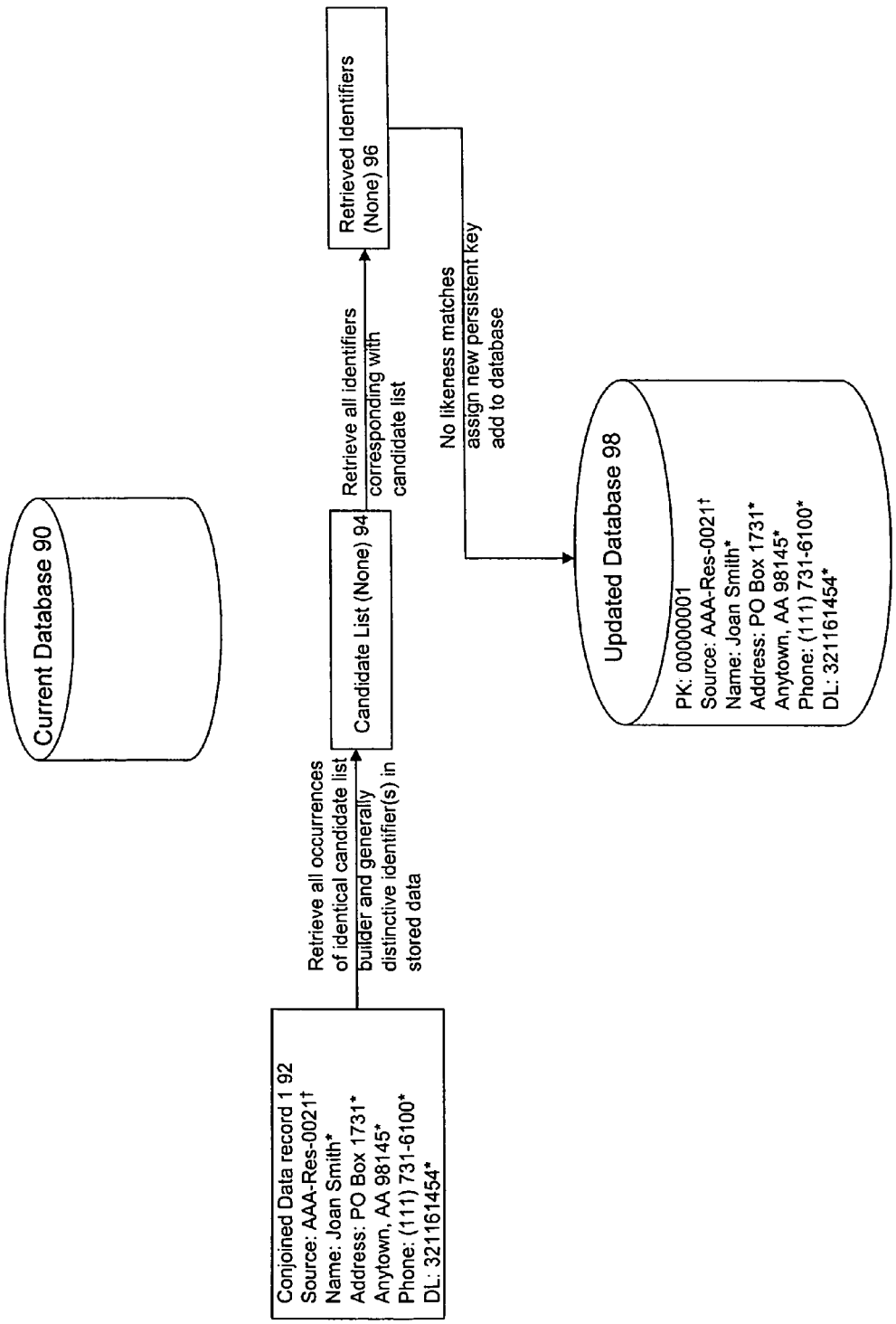

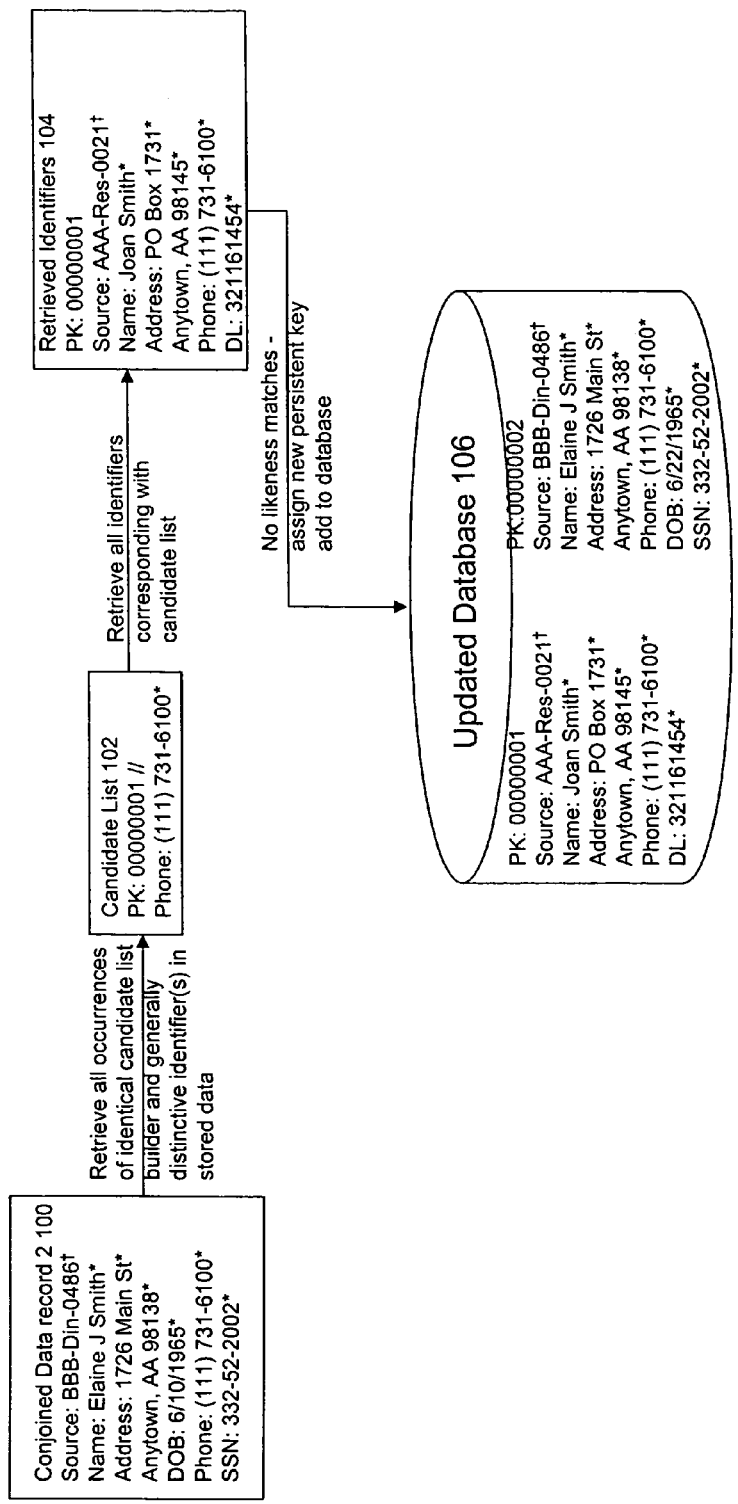
Figure 6 – Subsequent Record

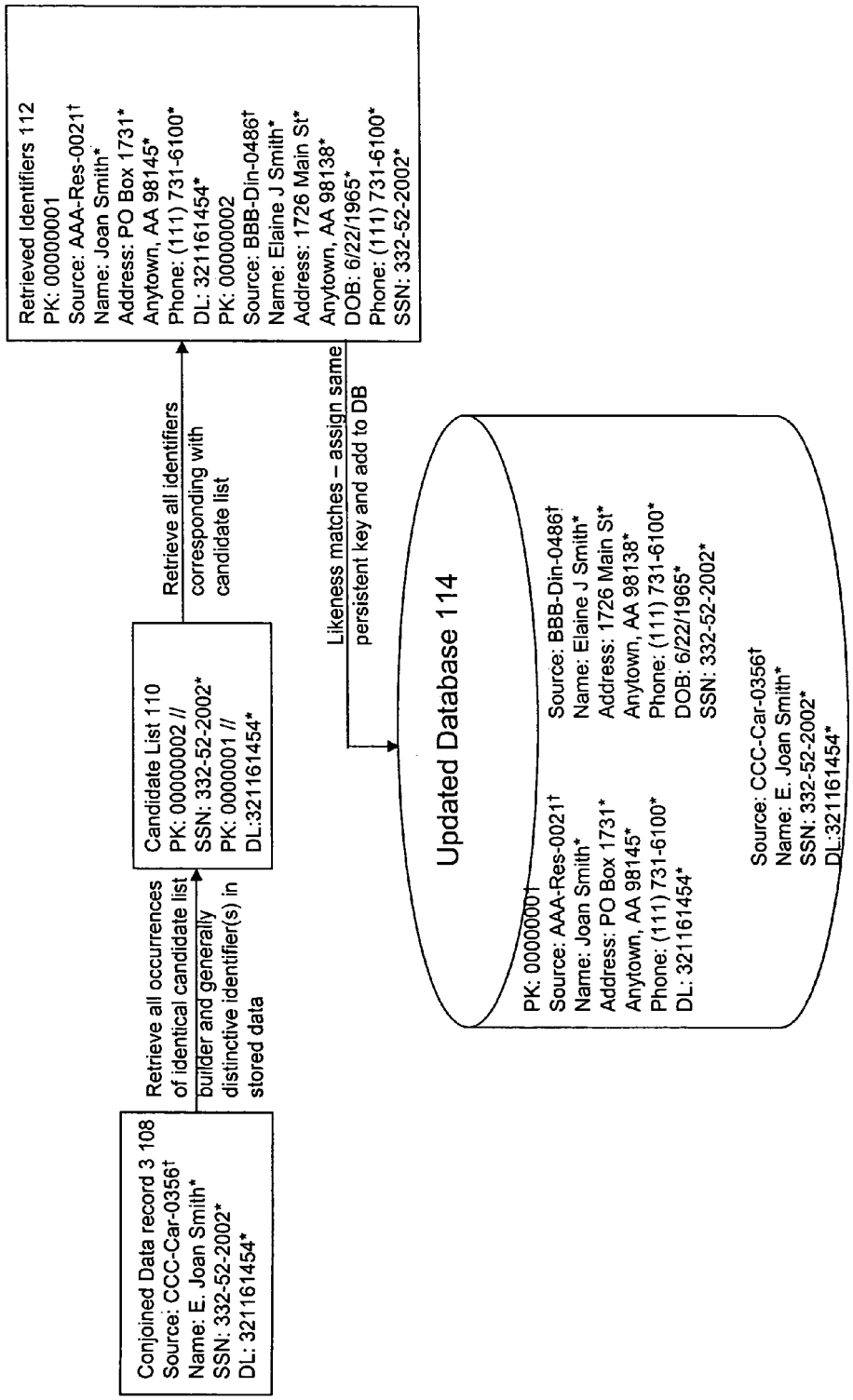
Figure 7 – Third Record ies or other problematic parties, while maintaining the security and confidentiality of such information and separating any information that is not relevant to the matter?
CONFIDENTIAL DATA SHARING AND ANONYMOUS ENTITY RESOLUTION

CROSS-REFERENCE TO RELATED APPLICATION

The present application claims the benefit of provisional application No. 60/424,240, filed in the United States Patent Office on Nov. 6, 2002.

FEDERALLY SPONSORED RESEARCH OR DEVELOPMENT

Not Applicable.

TECHNICAL FIELD

This invention relates to processing and retrieving data in a database and, more particularly, to a submission, comparison and matching/associating of data in a confidential and anonymous manner.

BACKGROUND OF THE INVENTION

In the wake of Sep. 11, 2001 events, various parties (e.g., corporations, governmental agencies or natural persons) face a common dilemma: how can parties share specific information (e.g., a terrorist watch list, black list or a list of actual or potential problematic entities) that would assist the same or separate parties in detecting the presence of potential terrorists or other problematic parties, while maintaining the security and confidentiality of such information and separating any information that is not relevant to the matter?

Hesitation to contribute or otherwise disclose, as well as laws governing the use and disclosure of, certain information is predicated upon a concern that the information could be used in a manner that would violate privacy or otherwise cause damage to the party. Such damage could include identity theft, unauthorized direct marketing activities, unauthorized or intrusive governmental activities, protected class (e.g., racial, religious, gender, ethnic) profiling and discrimination, anti-competitive practices, defamation and/or credit or economic damage.

In response to this dilemma, or any situation requiring the sharing of confidential data, it would be beneficial to have a system wherein various parties may contribute data to an internal or external process or repository in a manner that: (a) sufficiently identifies each record in the data (e.g., a source and record number) without disclosing any entity-identifiable data (e.g., name or social security number); (b) prepares the data so: (i) identical unique value(s) results from same data regardless of source and (ii) such data can be transmitted in a standard, but confidential, format to protect the confidentiality and security of the data, (c) compares the data to previously contributed data while the data is still in the confidential format, (d) constructs an identifiable entity (such as by utilizing a persistent key and analyzing and enhancing the record with confidential representations of potential aliases, addresses, numbers and/or other identifying information) through matching of the compared data, (e) constructs related entities through an association of the compared data, and/or (f) generates messages for appropriate parties (such as with relevant record identifying elements—e.g., a source and record number), such messages sometimes sent in a confidential manner, such as: (i) on an interval basis and/or wherein at least one message is noise (e.g., a message that does not correspond with a match or relation, but is issued to minimize certain vulnerabilities corresponding with traffic pattern analysis) and (ii) after such message has been processed through a reversible cryptographic algorithm (e.g., encoding, encryption or other algorithm used to engender a level of confidentiality, but can be reversed, such as by using decoding or decryption).

Current systems use various means to transfer data in a relatively confidential manner within or between parties. For example, some current systems use a reversible cryptographic algorithm, which modifies the data in order to engender some level of confidentiality and lower the risk of losing data during transmission, prior to transmitting data with the understanding that the recipient will use a comparable decoding or decryption method (i.e., an algorithm that reverses, returns or modifies the encoded/encrypted data to a format representative of the original data) in order to decipher and understand the data. However, once the data is deciphered, such data is subject to analysis and use in a manner that could cause the very damage that the encoding/encryption process was intended to protect against.

Other current systems use irreversible cryptographic algorithms (e.g., a one-way functions, such as MD-5 or other algorithm used to engender a level of confidentiality, but is irreversible) often as a document signature to make unauthorized document alteration detectable when the document is being shared across parties. Indeed, several existing irreversible cryptographic algorithms cause data to: (a) result in an identical unique value for same data regardless of source and (b) be undecipherable and irreversible to protect the confidentiality and security of the data. Any minor alteration (such as an extra space) in the data results in a different value after the use of the irreversible cryptographic algorithm as compared with data that does not have the minor alteration, even if the data is otherwise the same. Some current systems utilize an irreversible cryptographic algorithm to process a portion of the data and then match and merge records on a one-to-one basis based upon identical processed data. For example, current systems in a hospital may process the social security numbers in electronic patient records through a one-way function and then match and merge records on a one-to-one basis in a database based upon the processed social security numbers.

However, there are no existing systems that, at a minimum: (a) match received data—after at least a portion of such received data is processed through a cryptographic algorithm (e.g., reversible cryptographic algorithm, such as encoding or decryption, or an irreversible cryptographic algorithm, such as a one-way function)—with data previously stored in a database on a one-to-many or many-to-many basis (i.e., received data consists of one or more records that matches data previously stored in a database, the matched data previously stored in a database comprising more than one previously received record), limiting the ability in current systems to build upon identifiable entities while the data is still in a confidential format, (b) move beyond the initial match process to analyze whether any additional information is gained in the initial match and then match other data previously stored in a database based upon the additional information, further limiting the current systems ability to construct identifiable entities, (c) utilizing all or part of those functions identified in (a) and (b) in this paragraph, to match not only same entities, but associate various entities that are determined to be related in some manner (e.g., a passenger on an airline reservation list is a roommate of a natural person on an airline watch list) and/or (d) issue a plurality of messages wherein at least one of the plurality of messages is merely noise.

As such and in addition, there are no existing systems that can use the cryptographic algorithm to share and compare confidential data (including, without limitation, by leaving personally identifiable information in a cryptographic format), construct identifiable or related entities and message the appropriate entities in a manner that maintains security and confidentiality of the original data.

The present invention is provided to address these and other issues.

SUMMARY OF THE INVENTION

It is an object of the invention to provide a method, program and system for processing data in a database. The method, program and system preferably comprise the steps of: (a) receiving one or more records, each record having a plurality of identifiers (e.g., a plurality of data values of known types, such as two (2) data values of "John" corresponding with a known "first name" type and "Smith" corresponding with a known "last name" type, which is sometimes emanating from one data value which is parsed into separate values corresponding with separate known types, such as when an original data value of John Smith corresponding with a known "name" type is parsed into two (2) data values of John corresponding with a "first name" type and Smith corresponding with a "last name" type), each record corresponding with at least one entity, (b) utilizing a cryptographic algorithm to process at least two of the plurality of identifiers in the record, (c) sometimes, after transmitting the processed record to a separate system or database, comparing the processed record to previously stored data; and (d) matching the processed record with previously stored data that is determined to reflect the entity, the previously stored data that is determined to reflect the entity comprising at least a portion of at least two previously received records.

It is yet further contemplated that the method, program and system further comprise the steps of: (a) assigning or identifying a source to the record (e.g., an organization providing the record, a particular system within the organization, and a unique identifier representing the record in the particular system), (b) adding salt (i.e., additional data used to pad, modify, skew, or coat the processed data) to the record prior to the use of the cryptographic algorithm, and (c) sometimes deciphering at least a portion of the processed record (such as the source) after the step of matching the processed record with the previously stored data that is determined to reflect the entity.

It is further contemplated that the method, program and system further comprise the step of analyzing the record prior to the step of utilizing a cryptographic algorithm, which may include: (a) comparing the identifier against a user-defined criterion (such as a user-defined standard) or one or more data sets in a secondary database (such as querying the secondary database for a secondary identifier) or list and (b) enhancing the record, such as by: (i) generating at least one variant to at least one identifier and including the variant(s) with the record and (ii) supplementing the record with the secondary identifier(s).

It is further contemplated that the method, program and system further comprise the steps of: converting the record into a standard message format. For example, the method, program and system may convert the record into a standard message format by utilizing a type indicator (e.g., a designation, variable, tag or other indicator corresponding with a type, such as an XML tag corresponding with a type, such as name or phone number) for each of the identifiers. By way of further example, where the record contains three (3) identifiers corresponding with one (1) last name type and two (2) phone number types, a standardized record, utilizing <2> as the type indicator for the last name type and <3> as the type indicator for the phone number type, may result in the following: <2>Smith</2><3>111-222-3333</3><3>222-111-3131</3>. It is further contemplated that the type indicator may be discernable after the step of utilizing the cryptographic algorithm. For example, the standardized record set forth above in this paragraph, may result in the following after being processed in the cryptographic algorithm:

<2>23ff0ad398gl3ef82kcks83cke821apw</
  2><3>bcke39sck30cvk1002 ckwlAeMn301L3b</
  3><3>23kaPek309cwf319oc3f921ldks8773q</
  3>.

It is further contemplated that the step of matching the processed record includes the steps of: (a) retrieving the previously stored data having the identical identifier(s), (b) evaluating whether another identifier is included in the processed record that does not exist in the previously stored data, (c) analyzing the previously stored data for a match to the processed record based on the another identifier; (d) repeating the steps until the previously stored data is analyzed for a match to the processed record based upon the another identifier; and (e) assigning a persistent key (i.e., a unique numeric or alphanumeric identifier that, at a minimum, may be used to distinguish one or more records corresponding with a particular entity from other records corresponding with a different entity) associated with at least a portion of the previously stored data to the matched processed record. To the extent that the persistent key of the previously stored data is changed as a result of any matching, the system may save any prior persistent key(s) with a reference to the changed persistent key.

It is further contemplated that the method, program and system includes the steps of: (a) issuing one or more messages based upon a user-defined rule, such as: (i) wherein the message includes the source of the record and/or the source(s) of the previously stored data, which could be used to identify the relevant information in the other source(s), (ii) wherein at least one of the messages is noise, and/or (iii) in user-defined intervals and/or (b) storing the processed record in a database.

It is further contemplated that the method, process and system include the steps of: (a) receiving a record having a plurality of identifiers, the record corresponding with an entity, (b) utilizing a cryptographic algorithm to process at least two of the plurality of identifiers in the record (sometimes analyzing the record prior to utilizing the cryptographic algorithm), (c) comparing the processed record to previously stored data, (d) matching the processed record with previously stored data that is determined to reflect the entity based upon at least one of the plurality of identifiers, (e) analyzing whether another identifier is included in the processed record that is not included in the matched previously stored data; and (f) matching the matched data with secondary previously stored data that is determined to reflect the entity based upon the another identifier (sometimes storing the processed record in a database).

It is yet further contemplated that the method, system and program further comprise the steps of: (a) receiving a record having a plurality of identifiers, the record corresponding with an entity, (b) utilizing a cryptographic algorithm to process at least a portion of the record (sometimes analyzing and enhancing the record prior to utilizing the cryptographic algorithm), (c) comparing the processed record to previously stored data, and (d) associating the processed record with the previously stored data that is determined to reflect a relationship with the entity, and (e) storing the relationships with the entity in a database.

It is yet further contemplated that the method, system, and program further comprise the step of assigning a persistent key to the processed record.

It is yet further contemplated that the method, system, and program further comprise the steps of: (a) receiving a record having a plurality of identifiers, the record corresponding with an entity and at least one of the plurality of identifiers having previously been processed utilizing a cryptographic algorithm; (b) comparing the record to previously stored data, at least a portion of the previously stored data having been processed utilizing the cryptographic algorithm; (c) matching the record with the previously stored data that is determined to reflect the entity and/or associating the record with the previously stored data that is determined to reflect a relationship with the entity; and (d) issuing a plurality of messages wherein at least one of the plurality of messages is noise.

These and other aspects and attributes of the present invention will be discussed with reference to the following drawings and accompanying specification.

BRIEF DESCRIPTION OF THE DRAWINGS

FIG. 2 is a flowchart of the receive and process the record steps.

FIG. 3 is a flowchart of the Analyze record block in FIG. 2.

FIG. 4 is a flowchart of the Compare Conjoined Data block in FIG. 2.

FIGS. 5-7 are flowcharts further illustrating the Compare Conjoined Data block in FIG. 2.

DETAILED DESCRIPTION OF THE INVENTION

Figure 1:
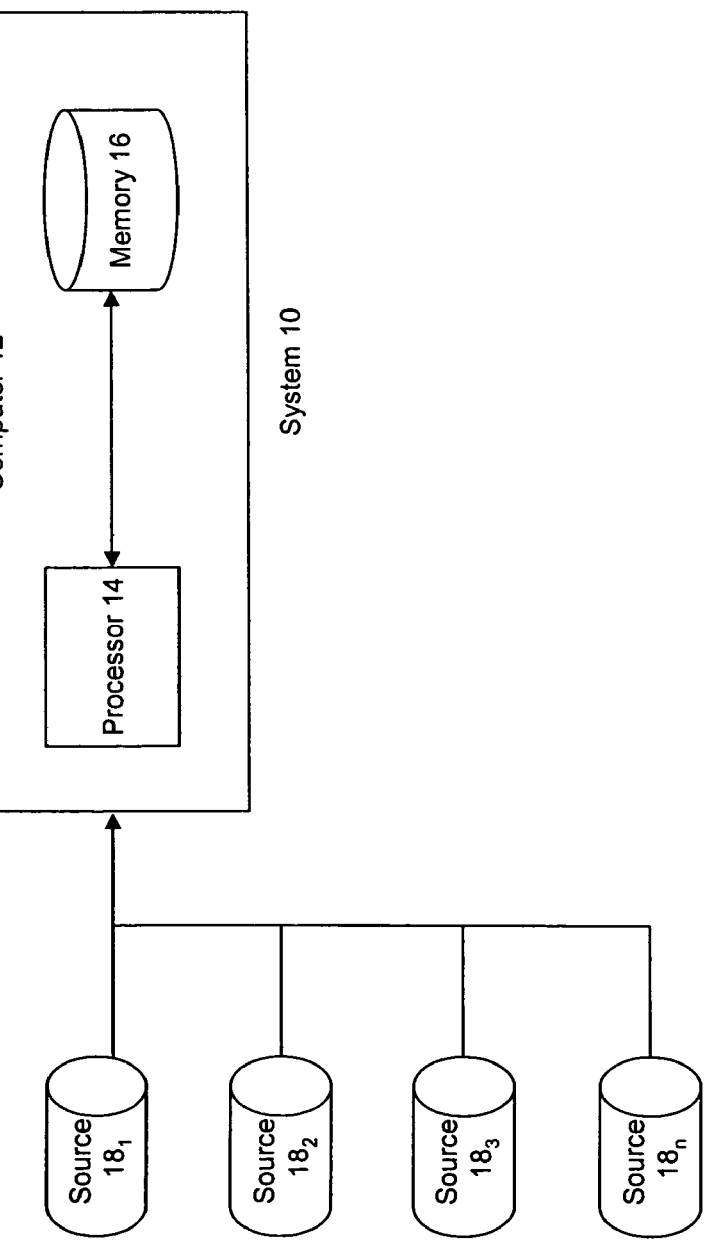
FIG. 1 is a functional block diagram of the system in accordance with the invention.

While this invention is susceptible of embodiment in many different forms, there is shown in the drawing, and will be described herein in a detailed, specific embodiment thereof with the understanding that the present disclosure is to be considered as an exemplification of the principles of the invention and is not intended to limit the invention to the specific embodiment illustrated.

A data processing system 10 for processing data prior to, and in, a database is illustrated in FIGS. 1 through 7. The system 10 includes at least one conventional computer 12 having a processor 14 and memory 16. The memory 16 is used both for storage of the executable software to operate the system 10 and for storage of the data in a database and random access memory. All or part of the software may be embodied within various applications and equipment, depending upon the relevant confidentiality and security requirements. For example, the software may be embodied, stored or provided on any computer readable medium utilizing any of the following, at a minimum: (a) an installed software application on the source system, (b) a box unit that self-destroys the unit upon any tampering, and/or (c) a CD, DVD or floppy disc. The computer 12 may receive inputs from one or more sources $18_1$-$18_n$.

The data comprises one or more records having a plurality of identifiers. Each record corresponds with one or more entities. The one or more entities may be natural persons, organizations, personal property, real property, proteins, chemical or organic compounds, biometric or atomic structures, or other items that can be represented by identifying data. For example, a record that contains identifiers for name, employer name, home address, work address, work telephone number, home telephone number, car license plate number, car type and social security number may correspond with, at a minimum, the following entities: (a) natural person, (b) organization (e.g., employer or airline), and/or (c) property (e.g., car).

The system 10 receives the data from the one or more sources $18_1$-$18_n$ and processes each of the received records as illustrated in FIG. 2. The software is stored in the memory 16 and is processed or implemented by the processor 14.

As illustrated in FIG. 2, the system 10 receives the received record in step 20 and processed the received record in a manner that comprises the following steps: (a) if the received record is not in a standard format (e.g., XML), converts the received record into a standard format in step 22 and (b) identifies, assigns or otherwise attributes the record to a source (e.g., one or more identifiers that identifies the record in or to the source $18_1$-$18_n$,— such as one or more primary keys of the record such as organization ID, system ID and record ID) in step 24 (the identifiers attributed to the source of the received record being "Attribution Data"). Alternatively, a coded cross-reference table is sometimes used whereby the Attribution Data is represented by an attribution key and the attribution key is used to locate the Attribution Value when necessary.

The system 10 further processes the received record in step 20 by analyzing and enhancing one or more of the plurality of identifiers of the received record in step 26 (the analyzed and enhanced identifiers of the record being "Enhanced Data") through: (a) comparing at least a portion of the identifiers of the received record 20 to a user-defined criteria and/or rules to perform several functions, such as: (i) name standardization in step 28 (e.g., comparing to a root names list), (ii) address hygiene in step 30 (e.g., comparing to postal delivery standards), (iii) geo-coding in step 32 (e.g., determining geographic locations, such as latitude and longitude coordinates), (iv) field testing or transformations in step 34 (e.g., comparing the gender field to confirm M/F or transforming Male to M), (v) user-defined formatting in step 36 (e.g., formatting all social security numbers in a 999-99-9999 format) and/or (vi) variant generation and inclusion in step 38 (e.g., common value alternatives or misspellings), (b) supplementing the received record in step 40 by causing the system 10 to access one or more databases in step 42 (which may contain the processing previously identified, thus causing the system to access additional databases in a cascading manner) to search for additional data (which may by submitted as new record(s) for receipt and processing in step 20) which can be added to the received record in step 44, and (c) building and including hash keys (e.g., a combination of certain data in the received record, such as the first three letters of a rooted first name, first four letters of last name and last five numbers of a social security number) in step 46. Any new, modified or enhanced data can be stored in newly created fields to maintain the integrity of the original data. By analyzing and enhancing the identifiers in each record, identifiers corresponding with the same entity are more likely to match (either through the original identifiers or through the new, modified or enhanced data).

Thereafter, all or part of the Enhanced Data is processed through a cryptographic algorithm and all or part of the Attribution Data is sometimes processed through a cryptographic algorithm in step 48, which may include adding salt to the Enhanced Data or the Attribution Data, for protection and confidentiality, such as: (a) utilizing an irreversible cryptographic algorithm (e.g., one-way function) to process the entity-identifiable Enhanced Data (the irreversible processed data being "Anonymized Data") and (b) sometimes utilizing a reversible cryptographic algorithm (e.g., encryption or encoding) to process the Attribution Data (the reversible processed data being "Protected Attribution Data").

The Anonymized Data and the Protected Attribution Data are then conjoined in step 50 (and sometimes further processed through a reversible cryptographic algorithm) (the conjoined Anonymized Data and the Protected Attribution Data being the "Conjoined Data") and transferred, processed and saved in a repository ("Repository") in step 52.

The location of the Repository in step 52 is less critical because the Conjoined Data in the Repository in step 52 will be in a confidential format. Furthermore, in this example, only the Attribution Data is susceptible to being reversed (e.g., decrypted or decoded) from the Conjoined Data. As such, even if an unauthorized party was able to reverse the Attribution Data, such party would be unable to access, read or otherwise evaluate the Enhanced Data. However, the entirety of the Conjoined Data may be used for comparison and identity recognition or correlation purposes, while maintaining confidentiality.

The system in the Repository in step 52 compares the Conjoined Data with previously stored data (such as from other sources and potentially a warehouse of stored data) and matches any data reflecting the same or related entities in step 54. As illustrated in FIG. 4, which is similarly exemplified in an invention by the inventor submitted under the title Real Time Data Warehousing, application Ser. No. 10/331,068, and published on Aug. 14, 2003 with publication number 2003/0154194A1, the system in the Repository analyzes the first identifier of the Conjoined Data in step 56 and determines whether such identifier is a candidate list builder identifier (e.g., an identifier that may help in differentiating between and across entities) in step 58. For example, an identifier representing the social security number for a natural person type entity is helpful in differentiating between and across entities and would be used to build a list of potential candidates that would be used for matching or relationship building. If the identifier is a candidate list builder identifier, the system would determine whether the identifier is generally distinctive across entities in step 60, such as by comparing the identifier to a list of common identifiers and determining whether such identifier is on the list. The system would determine whether there are any additional uncompared identifiers in the Conjoined Data in step 62 if the identifier is: (a) not a candidate list builder identifier or (b) a candidate list builder identifier, but not generally distinctive across entities.

If the identifier is a candidate list builder and a generally distinctive identifier, the system would retrieve all occurrences of the identical identifier in the previously stored data in step 64, unless the system, based upon a user-defined criterion, determines that the identifier ought not to be considered a generally distinctive identifier in step 66. For example, if: (a) the identifier represented a social security number and the processed value corresponded with the value of 999-99-9999 (e.g., a value used in the source system as a default in the event the social security number was unknown), and (b) the user-defined criteria corresponding with the social security number identifiers was to stop retrieving occurrences if the number of identical social security numbers reached fifty (50) (or some other set amount), at the point when the same social security number reached 51, the system would determine that the social security number is not a generally distinctive identifier and would stop retrieving occurrences.

If the identifier is still considered to be a generally distinctive identifier in step 66, the retrieved occurrences are updated or added to a candidate list and relationship records in step 68. However, if the system determines that the identifier is not to be considered a generally distinctive identifier in step 66, the system stops matching based upon the common identifier (such as by adding the identifier to the list of common identifiers) in step 70 and may un-match previous records that were matched based upon the common identifier in step 72. Finally, the system determines whether there are any additional uncompared identifiers in the Conjoined Data in step 62.

Once the system determines that there are no more uncompared identifiers in step 62, the system retrieves all of the identifiers used for confidence and/or identity recognition (whether or not such identifiers are candidate building identifiers) corresponding to the candidate list in step 74 and compares the Conjoined Data with the candidate list in step 76 to enable the system to create confidence indicators (such as a likeness indicator and a related indicator) and update the candidate list and relationship records with the confidence indicators in step 78. The system then determines whether there are any matches based upon the likeness indicator in step 80 and if a match is identified, evaluates whether the matched record(s) contains any new or previously unknown identifiers in step 82 that may be candidate list builder identifiers to add or update the candidate list/relationship records. This process is repeated in step 84 until no further matches can be discerned. The system would then assign all of the matched records the same persistent key in step 86. If no matches were found for any record, the Conjoined Data would be assigned a new persistent key in step 88. Throughout the entire process, the system retains full attribution of the Conjoined Data and the matching process does not lose any data through a merge, purge or delete function.

Another example of the step of comparing Conjoined Data to previously stored data to find matches of same entities is illustrated in FIGS. 5-7 (and although not specifically identified, FIGS. 5-7 identifies several functions used with respect to identifying associations of related entities). Starting from an empty database 90, Conjoined Data record one 92 (emanating from company AAA, reservations system, record 21 within the reservation system, or AAA-Res-0021, and after being standardized, analyzed and enhanced, anonymized and conjoined) is received in the Repository. Given no records in the database 90, the system would find no occurrences of identical candidate list and generally distinctive identifiers (which may be based upon variants and/or hash keys to enable "fuzzy logic"-like capabilities) in the stored data, resulting in an empty candidate list in step 94. Given the empty candidate list, no identifiers corresponding with the candidate list would be retrieved in step 96, no confidence indicators would be created, and therefore no likeness matches would occur. As such, the system would assign a new persistent key to the Conjoined Data record one and add the record to the database in step 98.

As further illustrated in FIG. 6, the same process would occur when Conjoined Data record two is received in the Repository in step 100, such as emanating from Company BBB, Dining system, record 0486 in the dining system (or BBB-Din-0486). The system would retrieve all occurrences of identical candidate list and generally distinctive identifiers in the stored data, identifying the same phone number (along with the persistent key) to be added to the candidate list in step 102. The system retrieves all identifiers corresponding to the candidate list, resulting in the data corresponding with the first record being retrieved in step 104. Based solely on a matched phone number, the system would create a relationship confidence indicator (such as indicating that the two individuals are roommates), but the telephone number match would not indicate a high confidence likeness match absent additional information confirming the likeness, such as same name or social security number. As such, without a likeness confidence indicator indicating a match, the system would assign the Conjoined Data record two a new persistent key and add the record to the database in step 106.

As further illustrated in FIG. 7, upon receipt of a Conjoined Data record three in step 108, such as emanating from company CCC, car rental system, record 0356 in the car rental system (or CCC-Car-0356), the system would retrieve all occurrences of identical candidate list and generally distinctive identifiers in the stored data, resulting in a candidate list identifying the social security number from Conjoined Data record one (along with the persistent key of Conjoined Data record one) and driver's license number from Conjoined Data record two (along with the persistent key of Conjoined Data record two) in step 110. The system would then retrieve all identifiers corresponding with the candidate list showing all identifiers from the two previously stored records in step 112. The system could then create confidence indicators based upon Conjoined Data record three and the retrieved data enabling likeness confidence indicators to be created indicating a match. Based upon the likeness matches, the system would assign the same persistent key to all of the records and add the Conjoined Data record three to the database in step 114. Sometimes, the prior persistent key corresponding with Conjoined Data record two, PK: 00000002, would be saved with a reference to the new persistent key, PK: 00000001, in order for the system to recognize at a later time that persistent key PK: 00000002 has since been changed to persistent key PK: 00000001.

Furthermore, as illustrated on FIG. 2, the Conjoined Data and any resulting relations and/or matches will be stored in step 116 and a series of messages, sent based upon user-defined rules in step 118, such as: (i) on a set interval basis, (ii) sometimes including a message that is merely noise to minimize a traffic analysis attack, and/or (iii) with respect to the true messages, identifying Protected Attribution Data from matched data. For example, relevant parties may be given the Protected Attribution Data (e.g., AAA-Res-0021, BBB-Din-0486 and/or CCC-Car-0356) which may be deciphered, although not the original data corresponding with the Attribution Data (which is unknown to the Repository), thus enabling such organization to request or share specific records corresponding with the Attribution Data from or with other relevant parties. By way of further example, in circumstances when a match or relation has not been determined within the intervals, a message of noise will be sent. Appropriate procedures would be established to maintain the confidentiality and security of the underlying Attribution Data.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for processing data in a computer, comprising the steps of:
    receiving, in the computer, a record having a plurality of identifiers, the record corresponding to an entity;
    utilizing, in the computer, a cryptographic algorithm to process at least two of the plurality of identifiers in the record to form a processed encrypted record;
    comparing, in the computer, the processed encrypted record to previously stored encrypted data;
    matching, in the computer, the processed encrypted record with the previously stored encrypted data that is determined to reflect the entity, the previously stored encrypted data that is determined to reflect the entity comprising at least a portion of at least one previously received record; and
    when the processed encrypted record matches with the previously stored encrypted data that is determined to reflect the entity, performing, in the computer, the steps of evaluating whether an additional identifier is included in the processed encrypted record that is not included in the previously stored encrypted data and updating the previously stored encrypted data to include the additional identifier as supplemental data in a newly created field in order to maintain the previously stored encrypted data's integrity.

2. The method of claim 1 further comprising the step of one of assigning and identifying a source to the record.

3. The method of claim 2 further comprising the step of deciphering at least a portion of the processed encrypted record after the step of matching the processed encrypted record with the previously stored encrypted data that is determined to reflect the entity.

4. The method of claim 3 wherein the deciphered at least a portion of the processed encrypted record is the source.

5. The method of claim 2 further comprising the step of issuing a message based upon a user-defined rule.

6. The method of claim 5 wherein the message includes one of the source of the record and at least one source of the previously stored encrypted data.

7. The method of claim 5 wherein the step of issuing a message based upon a user-defined rule includes the step of issuing a message in user-defined intervals.

8. The method of claim 1 further comprising the step of modifying the record prior to utilizing the cryptographic algorithm.

9. The method of claim 1 further comprising receiving a plurality of received records.

10. The method of claim 1 further comprising the step of analyzing the record prior to the step of utilizing the cryptographic algorithm to process at least a portion of the record.

11. The method of claim 10 wherein the step of analyzing the record includes comparing at least one of the plurality of identifiers against one of:
    a user-defined criterion; and
    a data set in one of a secondary database and a list.

12. The method of claim 11 further comprising the step of enhancing the record.

13. The method of claim 12 wherein the step of enhancing the record includes formatting the at least one of the plurality of identifiers in accordance with a user-defined standard.

14. The method of claim 12 wherein the step of enhancing the record includes generating a variant to the at least one of the plurality of identifiers and including the variant with the record.

15. The method of claim 12 wherein the step of enhancing the record includes:
    querying the data set for a secondary identifier relating to the record; and
    supplementing the record with the secondary identifier.

16. The method of claim 1 further comprising the step of converting the record into a standardized message format.

17. The method of claim 16 wherein the step of converting the record into a standardized message format includes the step of utilizing a type indicator corresponding with each of the plurality of identifiers.

18. The method of claim 17 wherein the type indicator is discernable after the step of utilizing the cryptographic algorithm.

19. The method of claim 1 wherein the step of matching the processed encrypted record with the previously stored encrypted data that is determined to reflect the entity includes the steps of:
   retrieving the previously stored encrypted data having at least one of the plurality of identifiers;
   evaluating whether another identifier is included in the processed encrypted record that is not included in the previously stored encrypted data having the at least one of the plurality of identifiers; and
   analyzing the previously stored encrypted data having the at least one of the plurality of identifiers for a match to the processed encrypted record based on the another identifier.

20. The method of claim 19 wherein the step of matching the processed encrypted record further comprises the step of retrieving a secondary previously stored encrypted data having the another identifier and including the secondary previously stored encrypted data with the previously stored encrypted data having the at least one of plurality of identifiers.

21. The method of claim 1 wherein the step of matching the processed encrypted record with the previously stored encrypted data that is determined to reflect the entity includes the step of assigning a persistent key associated with at least a portion of the previously stored encrypted data that is determined to reflect the entity to the matched processed encrypted record.

22. The method of claim 1 further comprising the step of storing the processed encrypted record in a database.

23. The method of claim 1 wherein the cryptographic algorithm is a reversible cryptographic algorithm or an irreversible cryptographic algorithm.

24. A method for processing data in a computer, comprising the steps of:
   receiving, in the computer, a record having a plurality of identifiers, the record corresponding to an entity;
   utilizing, in the computer, a cryptographic algorithm to process at least two of the plurality of identifiers in the record to form a processed encrypted record;
   comparing, in the computer, the processed encrypted record to previously stored encrypted data;
   determining, in the computer, matched data by matching the processed encrypted record with the previously stored encrypted data that is determined to reflect the entity based upon the plurality of identifiers;
   analyzing, in the computer, whether another identifier is included in the processed encrypted record that is not included in the previously stored encrypted data that is determined to reflect the entity based upon the plurality of identifiers;
   matching, in the computer, the matched data with the previously stored encrypted data that is determined to reflect the entity based upon the another identifier; and
   updating, in the computer, the previously stored encrypted data to include the another identifier as supplemental data in a newly created field in order to maintain the previously stored encrypted data's integrity.

25. The method of claim 24 further comprising the step of one of assigning and identifying a source to the record.

26. The method of claim 25 further comprising the step of deciphering at least a portion of the processed encrypted record after the step of matching the matched data.

27. The method of claim 26 wherein the deciphered at least a portion of the processed encrypted record is the source.

28. The method of claim 25 further comprising the step of issuing a message based upon a user-defined rule.

29. The method of claim 28 wherein the message includes one of the source of the record and at least one source of the previously stored encrypted data.

30. The method of claim 29 wherein the step of issuing a message based upon a user-defined rule includes the step of issuing a message in user-defined intervals.

31. The method of claim 24 further comprising the step of modifying the record prior to utilizing the cryptographic algorithm.

32. The method of claim 24 wherein the received record comprises a plurality of received records.

33. The method of claim 24 further comprising the step of analyzing the record prior to the step of utilizing the cryptographic algorithm to process at least a portion of the record.

34. The method of claim 33 wherein the step of analyzing the record includes the step of comparing at least one of the plurality of identifiers against one of:
   a user-defined criterion and a data set in one of a secondary database and a list.

35. The method of claim 34 further comprising the step of enhancing the record.

36. The method of claim 35 wherein the step of enhancing the record includes formatting the at least one of the plurality of identifiers in accordance with a user-defined standard.

37. The method of claim 35 wherein the step of enhancing the record includes generating a variant to the at least one of the plurality of identifiers and including the variant with the record.

38. The method of claim 35 wherein the step of enhancing the record includes:
   querying the data set for a secondary identifier relating to the record; and
   supplementing the record with the secondary identifier.

39. The method of claim 24 further comprising the step of converting the record into a standardized message format.

40. The method of claim 39 wherein the step of converting the record into a standardized message format includes the step of utilizing a type indicator corresponding with each of the plurality of identifiers.

41. The method of claim 40 wherein the type indicator is discernable after the step of utilizing the cryptographic algorithm.

42. The method of claim 24 wherein the step of matching the matched data includes the step of assigning a persistent key associated with at least a portion of the previously stored encrypted data that is determined to reflect the entity to the processed encrypted record.

43. The method of claim 24 further comprising the step of storing the processed encrypted record in a database.

44. A method for processing data in a computer, comprising the steps of:
   receiving, in the computer, a record having a plurality of identifiers, the record corresponding to an entity;
   utilizing, in the computer, a cryptographic algorithm to process at least two of the plurality of identifiers in the record to form a processed encrypted record;
   comparing, in the computer, the processed encrypted record to previously stored encrypted data;
   associating the processed encrypted record with the previously stored encrypted data that is determined to reflect a relationship with the entity;

evaluating, in the computer, whether an additional identifier is included in the associated processed encrypted record that is not included in the previously stored encrypted data; and updating, in the computer, the previously stored encrypted data to include the additional identifier as supplemental data in a newly created field in order to maintain the previously stored encrypted data's integrity.

45. The method of claim 44 further comprising the step of one of assigning and identifying a source to the record.

46. The method of claim 45 further comprising the step of deciphering at least a portion of the processed encrypted record after the step of associating the processed encrypted record with the previously stored encrypted data that is determined to reflect a relationship with the entity.

47. The method of claim 46 wherein the deciphered at least a portion of the processed encrypted record is the source.

48. The method of claim 45 further comprising the step of issuing a message based upon a user-defined rule.

49. The method of claim 48 wherein the message includes one of the source of the record and the source of the previously stored data.

50. The method of claim 48 wherein the step of issuing the message based upon the user-defined rule includes the step of issuing a message in user-defined intervals.

51. The method of claim 44 further comprising the step of modifying the record prior to utilizing the cryptographic algorithm.

52. The method of claim 44 wherein the received record comprises a plurality of received records.

53. The method of claim 44 wherein the previously stored encrypted data that is determined to reflect the relationship with the entity comprises at least a portion of two previously received records.

54. The method of claim 44 further comprising the step of analyzing the record prior to the step of utilizing the cryptographic algorithm to process at least two of the plurality of identifiers in the record.

55. The method of claim 54 wherein the step of analyzing the record includes comparing at least one of the plurality of identifiers against one of:
a user-defined criterion; and
a data set in one of a secondary database and a list.

56. The method of claim 55 further comprising the step of enhancing the record.

57. The method of claim 56 wherein the step of enhancing the record includes formatting the at least one of the plurality of identifiers in accordance with a user-defined standard.

58. The method of claim 56 wherein the step of enhancing the record includes generating a variant to the at least one of the plurality of identifiers and including the variant with the record.

59. The method of claim 56 wherein the step of enhancing the record includes:
querying the data set for a secondary identifier relating to the record; and
supplementing the record with the secondary identifier.

60. The method of claim 44 further comprising the step of converting the record into a standardized message format.

61. The method of claim 60 wherein the step of converting the record into a standardized message format includes the step of utilizing a type indicator corresponding with each of the plurality of identifiers.

62. The method of claim 61 wherein the type indicator is discernable after the step of utilizing the cryptographic algorithm.

63. The method of claim 44 further comprising the step of storing the processed encrypted record in a database.

64. The method of claim 44 further comprising the step of storing the relationships with the entity in a database.

65. A method for processing data in a computer, comprising the steps of:
receiving, in the computer, a record having a plurality of identifiers, the record corresponding with an entity and at least one of the plurality of identifiers having previously been encrypted utilizing a cryptographic algorithm, thereby resulting in a processed encrypted record;
comparing, in the computer, the processed encrypted record to previously stored encrypted data, at least a portion of the previously stored encrypted data having previously been encrypted utilizing the cryptographic algorithm;
matching, in the computer, the processed encrypted record with the previously stored encrypted data that is determined to reflect the entity;
issuing, in the computer, a plurality of messages in response to the match;
evaluating, in the computer, whether an additional identifier is included in the matched processed encrypted record that is not included in the previously stored encrypted data; and
updating, in the computer, the previously stored encrypted data to include the additional identifier as supplemental data in a newly created field in order to maintain the previously stored encrypted data's integrity.

66. The method of claim 65 wherein the step of issuing a plurality of messages occurs in user-defined intervals.

67. The method of claim 65 wherein at least one of the plurality of messages includes a source of the record.

68. The method of claim 65 further comprising the step of storing the record in a database.

69. A method for processing data in a computer, comprising the steps of:
receiving, in the computer, a record having a plurality of identifiers, the record corresponding with an entity and at least one of the plurality of identifiers having previously been encrypted utilizing a cryptographic algorithm, thereby resulting in a processed encrypted record;
comparing, in the computer, the processed encrypted record to previously stored encrypted data, at least a portion of previously stored data having previously been encrypted utilizing the cryptographic algorithm, thereby resulting in the previously stored encrypted data;
associating, in the computer, the processed encrypted record with the previously stored encrypted data that is determined to reflect a relationship with the entity;
issuing, in the computer, a plurality of messages in response to the associating step;
evaluating, in the computer, whether an additional identifier is included in the associated processed encrypted record that is not included in the previously stored encrypted data; and
updating, in the computer, the previously stored encrypted data to include the additional identifier as supplemental data in a newly created field in order to maintain the previously stored encrypted data's integrity.

70. The method of claim 69 wherein the step of issuing a plurality of messages occurs in user-defined intervals.

71. The method of claim 69 wherein at least one of the plurality of messages includes a source of the record.

72. The method of claim 69 further comprising the step of storing the record in a database.

73. The method of claim 69 further comprising the step of storing the relationships with the entity in a database.

74. A computer readable medium comprising a storage device containing program instructions for execution by a computer that results in the computer performing a method comprising the steps of:
  receiving, in the computer, a record having a plurality of identifiers, the record corresponding to an entity;
  utilizing, in the computer, a cryptographic algorithm to process at least two of the plurality of identifiers in the record to form a processed encrypted record;
  comparing, in the computer, the processed encrypted record to previously stored encrypted data;
  matching, in the computer, the processed encrypted record with the previously stored encrypted data that is determined to reflect the entity, the previously stored encrypted data that is determined to reflect the entity comprising at least a portion of at least one previously received encrypted record; and
  when the processed encrypted record matches with the previously stored encrypted data that is determined to reflect the entity, performing, in the computer, the steps of evaluating whether an additional identifier is included in the processed encrypted record that is not included in the previously stored encrypted data and updating the previously stored encrypted data to include the additional identifier as supplemental data in a newly created field in order to maintain the previously stored encrypted data's integrity.

75. The computer readable medium for performing the method of claim 74 further comprising the step of one of assigning and identifying a source to the record.

76. The computer readable medium for performing the method of claim 75 further comprising the step of deciphering at least a portion of the processed encrypted record after the step of matching the processed encrypted record with the previously stored encrypted data that is determined to reflect the entity.

77. The computer readable medium for performing the method of claim 76 wherein the deciphered at least a portion of the processed encrypted record is the source.

78. The computer readable medium for performing the method of claim 75 further comprising the step of issuing a message based upon a user-defined rule.

79. The computer readable medium for performing the method of claim 78 wherein the message includes one of the source of the record and at least one source of the previously stored encrypted data.

80. The computer readable medium for performing the method of claim 78 wherein the step of issuing a message based upon a user-defined rule includes the step of issuing a message in user-defined intervals.

81. The computer readable medium for performing the method of claim 74 further comprising the step of modifying the record prior to utilizing the cryptographic algorithm.

82. The computer readable medium for performing the method of claim 74 further comprising receiving a plurality of received records.

83. The computer readable medium for performing the method of claim 74 further comprising the step of analyzing the record prior to the step of utilizing the cryptographic algorithm to process at least a portion of the record.

84. The computer readable medium for performing the method of claim 83 wherein the step of analyzing the record includes comparing at least one of the plurality of identifiers against one of:
  a user-defined criterion; and
  a data set in one of a secondary database and a list.

85. The computer readable medium for performing the method of claim 84 further comprising the step of enhancing the record.

86. The computer readable medium for performing the method of claim 85 wherein the step of enhancing the record includes formatting the at least one of the plurality of identifiers in accordance with a user-defined standard.

87. The computer readable medium for performing the method of claim 85 wherein the step of enhancing the record includes generating a variant to the at least one of the plurality of identifiers and including the variant with the record.

88. The computer readable medium for performing the method of claim 85 wherein the step of enhancing the record includes:
  querying the data set for a secondary identifier relating to the record; and
  supplementing the record with the secondary identifier.

89. The computer readable medium for performing the method of claim 74 further comprising the step of converting the record into a standardized message format.

90. The computer readable medium for performing the method of claim 89 wherein the step of converting the record into a standardized message format includes the step of utilizing a type indicator corresponding with each of the plurality of identifiers.

91. The computer readable medium for performing the method of claim 90 wherein the type indicator is discernable after the step of utilizing the cryptographic algorithm.

92. The computer readable medium for performing the method of claim 74 wherein the step of matching the processed encrypted record with the previously stored encrypted data that is determined to reflect the entity includes the steps of:
  retrieving the previously stored encrypted data having at least one of the plurality of identifiers;
  evaluating whether another identifier is included in the processed encrypted record that is not included in the previously stored encrypted data having the at least one of the plurality of identifiers; and
  analyzing the previously stored encrypted data having the at least one of the plurality of identifiers for a match to the processed encrypted record based on the another identifier.

93. The computer readable medium for performing the method of claim 92 wherein the step of matching the processed encrypted record further comprises the step of retrieving a secondary previously stored encrypted data having the another identifier and including the secondary previously stored encrypted data with the previously stored encrypted data having the at least one of plurality of identifiers.

94. The computer readable medium for performing the method of claim 74 wherein the step of matching the processed encrypted record with the previously stored encrypted data that is determined to reflect the entity includes the step of assigning a persistent key associated with at least a portion of the previously stored encrypted data that is determined to reflect the entity to the matched processed encrypted record.

95. The computer readable medium for performing the method of claim 74 further comprising the step of storing the processed encrypted record in a database.

96. A computer readable medium comprising a storage device containing program instructions for execution by a computer that results in the computer performing a method comprising the steps of:
  receiving, in the computer, a record having a plurality of identifiers, the record corresponding to an entity;

utilizing, in the computer, a cryptographic algorithm to process at least two of the plurality of identifiers in the record to form a processed encrypted record;

comparing, in the computer, the processed encrypted record to previously stored encrypted data;

determining, in the computer, matched data by matching the processed encrypted record with the previously stored encrypted data that is determined to reflect the entity based upon the plurality of identifiers;

analyzing, in the computer, whether another identifier is included in the processed encrypted record that is not included in the previously stored encrypted data that is determined to reflect the entity based upon the plurality of identifiers;

matching, in the computer, the matched data with the previously stored encrypted data that is determined to reflect the entity based upon the another identifier; and updating, in the computer, the previously stored encrypted data to include the another identifier as supplemental data in a newly created field in order to maintain the previously stored encrypted data's integrity.

97. The computer readable medium for performing the method of claim 96 further comprising the step of one of assigning and identifying a source to the record.

98. The computer readable medium for performing the method of claim 97 further comprising the step of deciphering at least a portion of the processed encrypted record after the step of matching the matched data.

99. The computer readable medium for performing the method of claim 98 wherein the deciphered at least a portion of the processed encrypted record is the source.

100. The computer readable medium for performing the method of claim 96 further comprising the step of modifying the record prior to utilizing the cryptographic algorithm.

101. The computer readable medium for performing the method of claim 96 wherein the received record comprises a plurality of received records.

102. The computer readable medium for performing the method of claim 96 further comprising the step of analyzing the record prior to the step of utilizing the cryptographic algorithm to process at least a portion of the record.

103. The computer readable medium for performing the method of claim 102 wherein the step of analyzing the record includes the step of comparing at least one of the plurality of identifiers against one of:

a user-defined criterion and a data set in one of a secondary database and a list.

104. The computer readable medium for performing the method of claim 103 further comprising the step of enhancing the record.

105. The computer readable medium for performing the method of claim 104 wherein the step of enhancing the record includes formatting the at least one of the plurality of identifiers in accordance with a user-defined standard.

106. The computer readable medium for performing the method of claim 104 wherein the step of enhancing the record includes generating a variant to the at least one of the plurality of identifiers and including the variant with the record.

107. The computer readable medium for performing the method of claim 104 wherein the step of enhancing the record includes:

querying the data set for a secondary identifier relating to the record; and supplementing the record with the secondary identifier.

108. The computer readable medium for performing the method of claim 96 further comprising the step of converting the record into a standardized message format.

109. The computer readable medium for performing the method of claim 108 wherein the step of converting the record into a standardized message format includes the step of utilizing a type indicator corresponding with each of the plurality of identifiers.

110. The computer readable medium for performing the method of claim 109 wherein the type indicator is discernable after the step of utilizing the cryptographic algorithm.

111. The computer readable medium for performing the method of claim 96 wherein the step of matching the matched data includes the step of assigning a persistent key associated with at least a portion of the previously stored data that is determined to reflect the entity to the processed record.

112. The computer readable medium for performing the method of claim 96 further comprising the step of issuing a message based upon a user-defined rule.

113. The computer readable medium for performing the method of claim 112 wherein the message includes one of the source of the record and at least one source of the previously stored encrypted data.

114. The computer readable medium for performing the method of claim 113 wherein the step of issuing a message based upon a user-defined rule includes the step of issuing a message in user-defined intervals.

115. The computer readable medium for performing the method of claim 96 further comprising the step of storing the processed encrypted record in a database.

116. A computer readable medium comprising a storage device containing program instructions for execution by a computer that results in the computer performing a method comprising the steps of:

receiving, in the computer, a record having a plurality of identifiers, the record corresponding to an entity;

utilizing, in the computer, a cryptographic algorithm to process at least two of the plurality of identifiers in the record to form a processed encrypted record;

comparing, in the computer, the processed encrypted record to previously stored encrypted data;

associating, in the computer, the processed encrypted record with the previously stored encrypted data that is determined to reflect a relationship with the entity;

evaluating, in the computer, whether an additional identifier is included in the associated processed encrypted record that is not included in the previously stored encrypted data; and updating, in the computer, the previously stored encrypted data to include the additional identifier as supplemental data in a newly created field in order to maintain the previously stored encrypted data's integrity.

117. The computer readable medium for performing the method of claim 116 further comprising the step of one of assigning and identifying a source to the record.

118. The computer readable medium for performing the method of claim 117 further comprising the step of deciphering at least a portion of the processed encrypted record after the step of associating the processed encrypted record with the previously stored encrypted data that is determined to reflect a relationship with the entity.

119. The computer readable medium for performing the method of claim 118 wherein the deciphered at least a portion of the processed encrypted record is the source.

120. The computer readable medium for performing the method of claim 116 further comprising the step of modifying the record prior to utilizing the cryptographic algorithm.

121. The computer readable medium for performing the method of claim 116 wherein the received record comprises a plurality of received records.

122. The computer readable medium for performing the method of claim 116 wherein the previously stored encrypted data that is determined to reflect the relationship with the entity comprises at least a portion of two previously received records.

123. The computer readable medium for performing the method of claim 116 further comprising the step of analyzing the record prior to the step of utilizing the cryptographic algorithm to process at least two of the plurality of identifiers in the record.

124. The computer readable medium for performing the method of claim 123 wherein the step of analyzing the record includes comparing at least one of the plurality of identifiers against one of:
  a user-defined criterion; and
  a data set in one of a secondary database and a list.

125. The computer readable medium for performing the method of claim 124 further comprising the step of enhancing the record.

126. The computer readable medium for performing the method of claim 125 wherein the step of enhancing the record includes formatting the at least one of the plurality of identifiers in accordance with a user-defined standard.

127. The computer readable medium for performing the method of claim 125 wherein the step of enhancing the record includes generating a variant to the at least one of the plurality of identifiers and including the variant with the record.

128. The computer readable medium for performing the method of claim 125 wherein the step of enhancing the record includes:
  querying the data set for a secondary identifier relating to the record; and
  supplementing the record with the secondary identifier.

129. The computer readable medium for performing the method of claim 116 further comprising the step of converting the record into a standardized message format.

130. The computer readable medium for performing the method of claim 129 wherein the step of converting the record into a standardized message format includes the step of utilizing a type indicator corresponding with each of the plurality of identifiers.

131. The computer readable medium for performing the method of claim 130 wherein the type indicator is discernable after the step of utilizing the cryptographic algorithm.

132. The computer readable medium for performing the method of claim 116 further comprising the step of issuing a message based upon a user-defined rule.

133. The computer readable medium for performing the method of claim 132 wherein the message includes one of the source of the record and the source of the previously stored encrypted data.

134. The computer readable medium for performing the method of claim 132 wherein the step of issuing the message based upon the user-defined rule includes the step of issuing a message in user-defined intervals.

135. The computer readable medium for performing the method of claim 116 further comprising the step of storing the processed encrypted record in a database.

136. The computer readable medium for performing the method of claim 116 further comprising the step of storing the relationships with the entity in a database.

137. A computer readable medium comprising a storage device containing program instructions for execution by a computer that results in the computer performing a method comprising the steps of:
  receiving, in the computer, a record having a plurality of identifiers, the record corresponding with an entity and at least one of the plurality of identifiers having previously been encrypted utilizing a cryptographic algorithm, thereby resulting in a processed encrypted record;
  comparing, in the computer, the processed encrypted record to previously stored encrypted data, at least a portion of the previously stored encrypted data having previously been encrypted utilizing the cryptographic algorithm;
  matching, in the computer, the processed encrypted record with the previously stored encrypted data that is determined to reflect the entity;
  issuing, in the computer, a plurality of messages in response to the match;
  evaluating, in the computer, whether an additional identifier is included in the matched processed encrypted record that is not included in the previously stored encrypted data; and
  updating, in the computer, the previously stored encrypted data to include the additional identifier as supplemental data in a newly created field in order to maintain the previously stored encrypted data's integrity.

138. The computer readable medium for performing the method of claim 137 wherein the step of issuing a plurality of messages occurs in user-defined intervals.

139. The computer readable medium for performing the method of claim 137 wherein at least one of the plurality of messages includes a source of the record.

140. The computer readable medium for performing the method of claim 137 further comprising the step of storing the record in a database.

141. A computer readable medium comprising a storage device containing program instructions for execution by a computer that results in the computer performing a method comprising the steps of:
  receiving, in the computer, a record having a plurality of identifiers, the record corresponding with an entity and at least one of the plurality of identifiers having previously been encrypted utilizing a cryptographic algorithm, thereby resulting in a processed encrypted record;
  comparing, in the computer, the processed encrypted record to previously stored encrypted data, at least a portion of the previously stored encrypted data having previously been encrypted utilizing the cryptographic algorithm;
  associating, in the computer, the processed encrypted record with the previously stored encrypted data that is determined to reflect a relationship with the entity;
  issuing, in the computer, a plurality of messages in response to the associating step;
  evaluating whether an additional identifier is included in the associated processed encrypted record that is not included in the previously stored encrypted data; and
  updating, in the computer, the previously stored encrypted data to include the additional identifier as supplemental data in a newly created field in order to maintain the previously stored encrypted data's integrity.

142. The computer readable medium for performing the method of claim 141 wherein the step of issuing a plurality of messages occurs in user-defined intervals.

143. The computer readable medium for performing the method of claim 141 wherein at least one of the plurality of messages includes a source of the record.

144. The computer readable medium for performing the method of claim 141 further comprising the step of storing the record in a database.

145. The computer readable medium for performing the method of claim 141 further comprising the step of storing the relationships with the entity in a database.

* * * * *